(12) United States Patent
Altmikus et al.

(10) Patent No.: US 8,727,265 B2
(45) Date of Patent: May 20, 2014

(54) HELICOPTER WITH CYCLOIDAL ROTOR SYSTEM

(75) Inventors: Andree Altmikus, Hoehenkirchen-Siegertsbrunn (DE); Marius Bebesel, Munich (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 0 days.

(21) Appl. No.: 13/440,160

(22) Filed: Apr. 5, 2012

(65) Prior Publication Data

US 2012/0256042 A1 Oct. 11, 2012

(30) Foreign Application Priority Data

Apr. 11, 2011 (EP) .................................... 11400027

(51) Int. Cl.
*B64C 27/00* (2006.01)
*B64C 27/82* (2006.01)

(52) U.S. Cl.
USPC .................... 244/17.21; 244/17.11; 244/17.19

(58) Field of Classification Search
USPC ................................ 244/17.11, 17.19, 17.21
See application file for complete search history.

(56) References Cited

U.S. PATENT DOCUMENTS

| | | | | |
|---|---|---|---|---|
| 1,761,053 A * | 6/1930 | Rystedt | ............................. | 244/9 |
| 2,580,428 A | 1/1952 | Heuver | | |
| 3,807,662 A * | 4/1974 | Velazquez | ................... | 244/17.19 |
| 4,948,068 A * | 8/1990 | VanHorn | ..................... | 244/17.19 |
| 5,240,205 A * | 8/1993 | Allongue | ..................... | 244/17.19 |
| 5,676,335 A * | 10/1997 | Murgia et al. | .............. | 244/17.19 |
| 6,007,021 A * | 12/1999 | Tsepenyuk | ........................ | 244/9 |
| 6,036,141 A * | 3/2000 | Clay | ........................... | 244/17.19 |
| 2012/0248240 A1* | 10/2012 | Polovinkin | ................. | 244/17.21 |
| 2013/0119186 A1* | 5/2013 | Heid | ........................... | 244/17.21 |

FOREIGN PATENT DOCUMENTS

| | | | |
|---|---|---|---|
| DE | 102007009951 B3 * | 7/2008 | |
| DE | 102008015073 A1 | 10/2009 | |
| JP | 2009051381 A | 12/2009 | |
| WO | 2007106137 A1 | 9/2007 | |
| WO | 2009109918 A2 | 9/2009 | |

OTHER PUBLICATIONS

Search Report and Written Opinion; Application No. EP 11400027; dated Sep. 2, 2011.

* cited by examiner

*Primary Examiner* — Tien Dinh
*Assistant Examiner* — Michael Wang
(74) *Attorney, Agent, or Firm* — Brooks Kushman P.C.

(57) ABSTRACT

The invention is related to a helicopter (10) comprising a main rotor (12), a cycloidal rotor (14) and a rotating cylinder (18). The rotating cylinder (18) extends along a longitudinal axis of a tail boom (13). The cycloidal rotor (14) extends at least partly along said same tail boom (13) and rotates outside the rotating cylinder (18).

16 Claims, 2 Drawing Sheets

HELICOPTER WITH CYCLOIDAL ROTOR SYSTEM

CROSS REFERENCE TO RELATED APPLICATIONS

This application claims priority to European patent application serial no. EP 11 400027.6 filed Apr. 11, 2011, the disclosure of which is incorporated in its entirety by reference herein.

BACKGROUND OF THE INVENTION (1) Field of the Invention

The invention is related to a helicopter with a cycloidal rotor system with blades disposed at a tail boom with the features of the preamble of the claim 1.

(2) Background Art

An empennage of a classical helicopter configuration features 1. a fixed horizontal stabilizer, 2. a fixed vertical fin and 3. a tail rotor.
1. The horizontal stabilizer provides static pitch attitude stability, by generating a negative lift and provides via the tail boom lever a velocity dependent positive pitch, in order to keep the fuselage in a more or less horizontal position minimizing the configuration drag but at the cost of positive lift. A first problem of this classical configuration is: Since the horizontal stabilizer incidence angle is fixed, its negative lift cannot be fully adjusted to the flight condition, keeping the fuselage in its minimum drag position. Finally, due to this problem the pilot is lacking one degree of control freedom to fully control fuselage and aircraft attitude.
2. The vertical fin provides yaw stability and generates in forward flight part or all of the antitorque for the main rotor. Again the vertical fin incidence is built in and thus fixed, resulting in a side force that cannot be freely adjusted and that is dependent on the forward flight speed of the helicopter.
3. The possibility to freely adjust said side force is provided by the tail rotor, providing all of the antitorque force in hover condition and almost no additional force in cruise. The side forces and the lift act in a vertical plane with a normal vector parallel to the tail boom. A second problem is the helicopter's limited maximum horizontal speed, since the main rotor has to provide the propulsive force. This propulsive force is naturally limited, since it depends on the rotor specific limitations in tilting the tip path plane forward.

The document U.S. Pat. No. 2,580,428 A discloses an aircraft with cycloidal propulsion units including respectively airfoil blades pivotally mounted along an essentially horizontal blade axis parallel to the hub axis and perpendicular to a longitudinal axis of the aircraft.

The document WO 2007106137 A1 discloses a cycloidal propulsion unit for controlling a thrust vector including a hub that rotates about a hub axis. Further, the unit includes an airfoil blade pivotally mounted on the hub along a blade axis parallel to the hub axis and perpendicular to a longitudinal axis of the aircraft. As a result, the blade may pivot about the blade axis while travelling along a blade path during rotation of the hub. The unit further includes a ring that rotates around a ring axis parallel to the hub axis. The ring is interconnected with the blade via a control rod. Also, a device is engaged with the ring to selectively position the ring axis relative to the hub axis. As a result of these structures, selective positioning of the ring axis provides control of the rotation of the blade about the blade axis as the blade travels along the blade path.

The document WO 2009109918 A2 discloses a cycloidal rotor system having airfoil blades travelling along a generally non-circular, elongated and, in most embodiments, dynamically variable orbit. Such non-circular orbit provides a greater period in each revolution and an optimized relative wind along the trajectory for each blade to efficiently maximize lift when orbits are elongated horizontally, or thrust/propulsion when orbits are vertically elongated. Most embodiments, in addition to having the computer system controlled actuators to dynamically vary the blade trajectory and the angle of attack, can also have the computer system controlled actuators for dynamically varying the spatial orientation of the blades; enabling their slanting motion upward/downward and/or back sweep/forward sweep positioning to produce and precisely control a variety of aerodynamic effects suited for providing optimum performance for various operating regimes, counter wind gusts and enable the craft to move sideways and to allow roll and yaw control of the aircraft. Thus a rotor is provided, which when used in a VTOL rotorcraft, will require lower engine power to match or exceed the operating performance of VTOL rotorcrafts equipped with prior art rotors, this rotor also offers increased efficiency and decreased required power when used for generating the propulsive force for various vehicles or used as a fan.

The document JP 2009051381 A discloses a cycloidal blade capable of generating an advancing force during forward flying and accelerating forward speed, said cycloidal blade being disposed at the rear end of a tail boom of a helicopter to generate a propulsive force F in one direction. The blade includes a rotating shaft which extends along a vertical shaft of the helicopter, a plurality of blades which extend along the vertical shaft of the helicopter and rotate together with the rotating shaft, and a pitch angle change mechanism which decreases a pitch angle of the blade passing the opposite side to the one direction by moving in a direction opposite to the one direction, and increases the pitch angle of the blade passing on the same side with the one direction.

The document DE 102007009951 B3 discloses an aircraft with a closed cylinder drivable around a transverse axis of the aircraft with a controllable number of revolutions for generation of lift and/or propulsion after the Magnus effect. A radial blower having adjustable driving power is assigned to each of the cylinders for generating air flow that flows transversely against the cylinder. A wing profile of the radial blower has rotor blades that are pivotable around an aligned axis parallel to a rotation axis where a rotor of the radial blower concentrically surrounds the cylinder with a distance.

The document U.S. Pat. No. 1,761,053 discloses an airplane with a semi-cylindrical housing open upward and with a rotatable plane operable in the housing.

The document DE102008015073 A1 discloses a helicopter with a main rotor arranged on a cabin, on which a rear rotor is fixed over a rear bracket at a distance from the cabin for torque balancing. The rear bracket is provided with units for aerodynamic support for torque balancing. The devices for aerodynamic support for the torque balancing comprise a high-lift flap on the side turned away from the main rotor rotating direction extending along the rear bracket for accelerating the flow of the discharged air passing through the area of main rotor.

The document U.S. Pat. No. 4,948,068 A discloses a no tail rotor system for a helicopter. The addition of vortex generators in the longitudinal slots or nozzles, which produce the circulation control portion of the system which combines with a jet thruster and fluid resource, replaces the tail rotor.

The common disadvantage of all of said rotor systems of the state of the art is a low lift to drag ratio, limiting the efficiency of the generation of a propulsive force.

BRIEF SUMMARY OF THE INVENTION

It is an object of the present invention to provide a helicopter without the disadvantages of the state of the art.

A solution is provided with a helicopter with a cycloidal rotor system with the features of claim 1. Preferred embodiments of the invention are presented in the subclaims.

According to the invention a helicopter is provided with at least one main rotor with an essentially vertical axis of rotation, a tail boom extending along a longitudinal axis essentially perpendicular with regard to said vertical axis of rotation and at least one anti-torque device. At least one cycloidal rotor is provided extending along said longitudinal axis of the tail boom said at least one cycloidal rotor having airfoil blades being rotated for anti-torque around said longitudinal axis of the helicopter the speed of said rotation being variable. The airfoil blades of said at least one cycloidal rotor are inclined relative to said longitudinal axis of the helicopter. Rotation creates aerodynamic effects at each of the airfoil blades that sum up to a lateral force resulting approximately in the middle of said at least one cycloidal rotor with some distance from the hub of the main rotor. The direction of rotation of said at least one cycloidal rotor and the inclination of each of the airfoil blades are tuned to create a lateral force with a suitable direction at said distance from the hub of the main rotor to provide anti torque to counter the operational torque of the main rotor. By varying the rotational speed of said at least one cycloidal rotor the lateral force is adapted to balance the operational torque of the main rotor for a controllable flight of the helicopter allowing for example at high forward speed of the helicopter to reduce the rotational speed of the cycloidal rotor as more anti torque may be contributed by a vertical tail thus allowing economy with regard to energy consumption of the inventive helicopter.

According to a preferred embodiment of the invention the inclination of each of the airfoil blades may be controlled relative to the longitudinal axis of the inventive helicopter to vary the direction of the force generated by the cycloidal rotor to allow as well yaw and pitch stabilization by means of said at least one cycloidal rotor allowing to replace the effect of any horizontal tail and thus allowing a more simple helicopter, said force being particularly directed to counteract the main rotor torque. The inventive helicopter with the cycloidal rotor allows for replacement of a classical tail rotor, any horizontal stabilizer and any vertical tail at the rear end of the tail boom of a helicopter and thus the inventive concept allows the provision of an improved helicopter with less structural elements.

Preferably said helicopter comprises as a second type of anti-torque means a rotating cylinder which extends inside said cycloidal rotor along said longitudinal axis of the tail boom and which is driven to produce a Magnus effect side force. The rotating cylinder extends from the fuselage towards a rear end of the tail boom of the inventive helicopter. According to a further advantage of the invention the rotating cylinder creates a force due to the down wash of the main rotor in a transversal direction to the tail boom. With a suitable rotational direction of the rotating cylinder relative to the rotational direction of the main rotor—mainly in hover flight—said force can principally be directed to counteract the effect of the main rotor torque to the inventive helicopter.

According to a preferred embodiment of the invention a three actuator combination drives the cycloidal rotor by means of a translational control plate with two translational degrees of freedom in a plane perpendicular to said longitudinal axis allowing said cycloidal rotor a thrust vector in any direction of a plane vertical to the longitudinal axis of the tail boom.

According to a further preferred embodiment of the invention a tail propeller is provided with a rotational axis in line with the tail boom to provide efficient thrust compounding for higher horizontal speed of the helicopter.

According to a further preferred embodiment of the invention said tail propeller is coupled to the tail boom by means of a gear box to adjust for different rotational speeds of cycloidal rotor and tail propeller.

According to a further preferred embodiment of the invention a periphery of the closed cylinder is provided with dimples and/or increased surface roughness for reduced drag in the downwash of the main rotor.

BRIEF DESCRIPTION OF THE SEVERAL VIEWS OF THE DRAWINGS

Preferred embodiments of the invention are presented in more detail with regard to the following description and reference to the attached drawings.

DETAILED DESCRIPTION OF THE INVENTION

Figure 1:
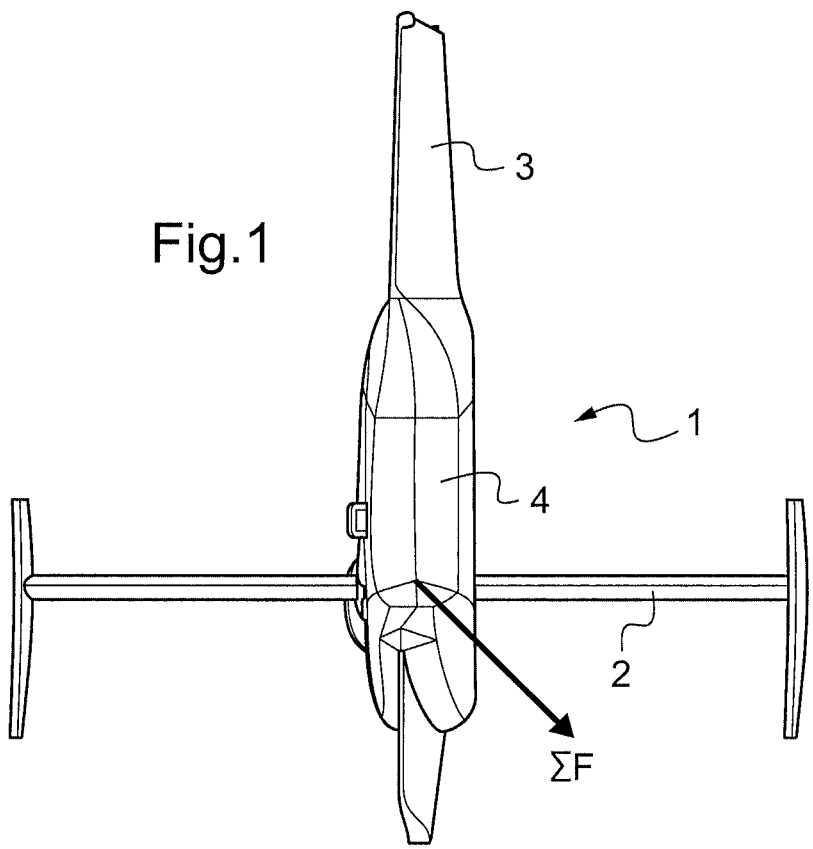
FIG. 1 shows a force diagram of a tail boom of a helicopter of the state of the art.

According to FIG. 1 an empennage 1 of a classical helicopter (not shown) comprises a fixed horizontal stabilizer 2, a fixed vertical fin 3 and a tail rotor 4. The horizontal stabilizer 2 generates a negative lift, the vertical fin 3 provides yaw stability and generates in forward flight part or all of the antitorque for the main rotor while the tail rotor 4 provides all of the antitorque force in hover condition and almost no additional force in cruise. ΣF indicates direction and amplitude of the resulting force at the empennage 1 said resulting force being principally directed vertical to a tail boom of said helicopter.

Figure 2:
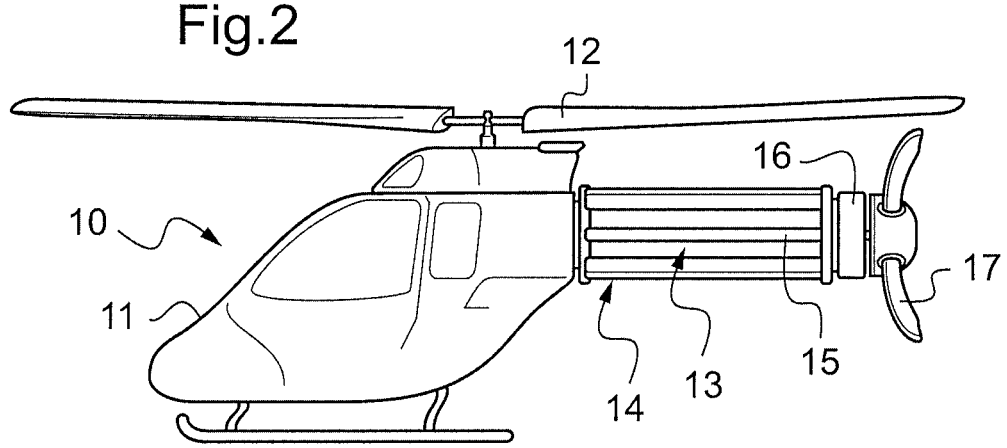
FIG. 2 shows a schematic view of a helicopter according to the invention.

According to FIG. 2 the helicopter 10 has a fuselage 11 and is equipped with a main rotor 12. A tail boom 13 with a longitudinal axis is fixed to the fuselage 11. A cycloidal rotor 14 of individual blades 15 surrounds the tail boom 13 between the fuselage and its rear end 16, said blades 15 being essentially parallel to the longitudinal axis of the tail boom 13. The radius of the main rotor 12 extends beyond the entire length of any of the blades 15. Consequently the blades 15 are within the downwash of the main rotor 12 in operation.

A three actuator combination (not shown) drives the cycloidal rotor 14 by means of a translational control plate (not shown) with two translational degrees of freedom in a plane perpendicular to said longitudinal axis. Said drive comprises an electric motor arranged at the periphery of the tail boom 13 and being drivingly connected to the cycloidal rotor 14.

A tail propeller 17 is rotatable fixed to the tail boom 13, said tail propeller 17 being coaxial with the cycloidal rotor 14 and having the same rotational speed. A gear box (not shown) is provided between cycloidal rotor 14 and tail propeller 17 to adjust for different rotational speeds of cycloidal rotor 14 and tail propeller 17.

Figure 3:
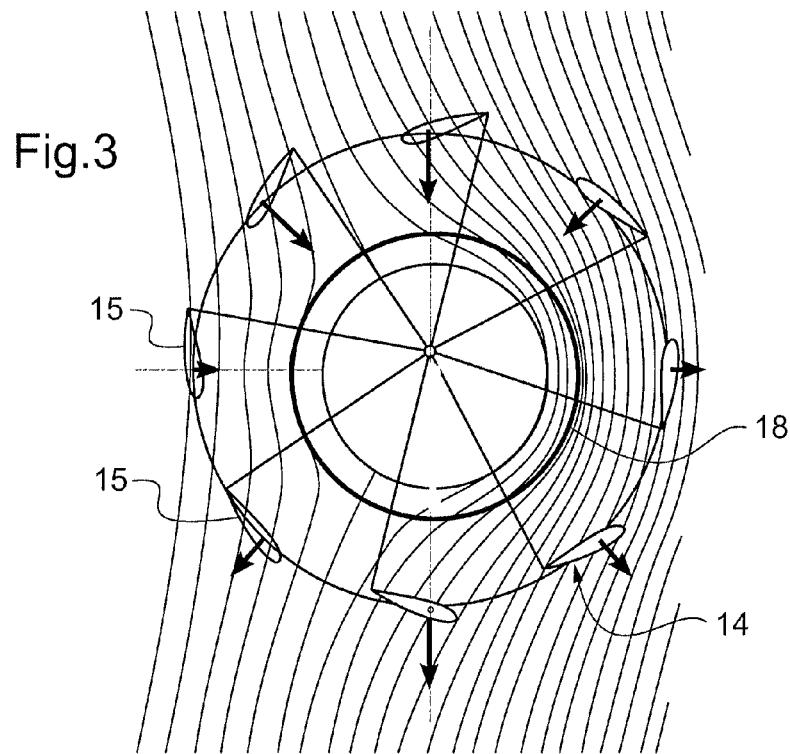
FIG. 3 shows a force diagram for a cycloidal rotor and a rotational cylinder of the helicopter according to the invention, FIGS. 4 and 5 each show a schematic view of a preferred embodiment of the helicopter according to the invention.

According to FIG. 3 corresponding features are referred to with the references of FIG. 1, 2. The tail boom 13 is surrounded by a closed rotating cylinder 18 being driven in a range of 1000-2000 rpm. The rotating cylinder 18 has a diameter range of 300-800 mm. The cycloidal rotor 14 is eccentrically arranged with respect to the rotating cylinder 18. The cycloidal rotor 14 is driven to rotate in the same or a direction contrary to the rotational direction of the rotating cylinder 18. The diameter of the cycloidal rotor 14 is always more than that of the rotating cylinder 18 and is in the range of 600-1600 mm. The cycloidal rotor 14 has five to fifteen blades 15. Any force vector resulting from the blades 15 of the cycloidal rotor 14 is freely controllable by changing respectively the inclinations of the blades 15 with regard to their trajectories. The periphery of the rotating cylinder 18 is provided with dimples and/or increased surface roughness. The rotating cylinder 18 is driven by the electric motor arranged at the periphery of the tail boom 13.

Figure 4:
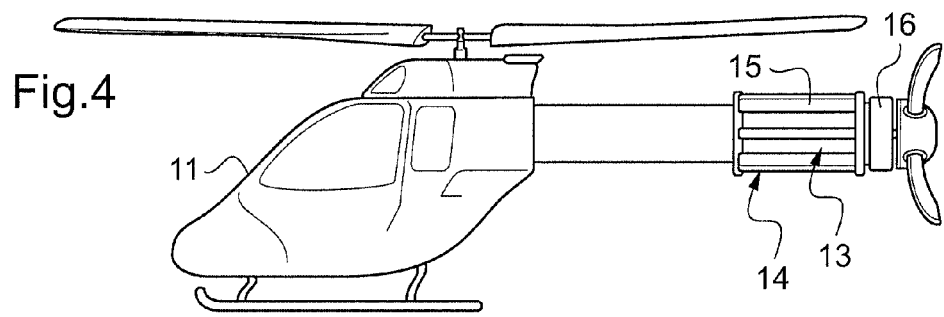
Figure 5:
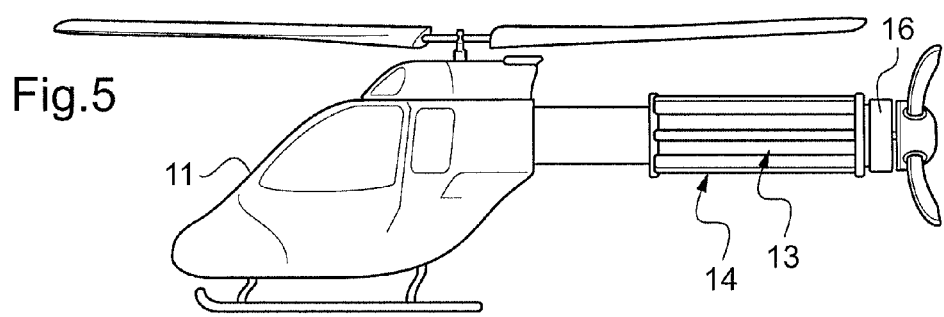

According to FIGS. 4 and 5 the cycloidal rotor 14 extends from the rear end 16 of the tail boom 13 towards the fuselage 11 covering approximately ⅓ to ⅔ of the length of the tail boom 13 with the radius of the main rotor 12 essentially extending along the entire length of the blades 15.

What is claimed is:

1. A helicopter comprising:
   at least one main rotor, and
   a tail boom extending along a longitudinal axis, said tail boom being provided with at least one anti-torque device,
   wherein at least one cycloidal rotor with individual airfoil blades is provided, said at least one cycloidal rotor extending along said longitudinal axis of the tail boom and being driven to rotate for anti-torque around said longitudinal axis with a controllable rotational speed, and the radius of the main rotor is greater than a length of the cycloidal rotor blades, and wherein at least one rotating cylinder is provided, said rotating cylinder extending at least partly along said same tail boom and rotating inside the cycloidal rotor with an axis of rotation that is eccentrically arranged with respect to an axis of rotation of the cycloidal rotor.

2. The helicopter according to claim 1, wherein each of the airfoil blades is pivotable relative to said longitudinal axis for yaw and pitch stabilization.

3. The helicopter according to claim 1, wherein a control is provided said control allowing the cycloidal rotor to give a controllable thrust vector in any direction of a plane vertical to the longitudinal axis of the tail boom.

4. The helicopter according to claim 1, wherein a tail propeller is provided with a rotational axis in line with the axis of the cycloidal rotor.

5. The helicopter according to claim 4, wherein the tail propeller is coupled to the tail boom by means of a gear box.

6. The helicopter according to claim 4, wherein the tail propeller is configured to rotate at a same rotational speed as the cycloidal rotor.

7. The helicopter according to claim 1, wherein a periphery of the rotating cylinder is provided with dimples and/or increased surface roughness.

8. A helicopter comprising:
   a main rotor;
   a tail boom extending along a longitudinal axis; and
   a cycloidal rotor surrounding a portion of the tail boom and having an axis of rotation parallel to the longitudinal axis, the cycloidal rotor including a plurality of blades having spans oriented generally parallel to the axis of rotation and configured to generate a lateral anti-torque force; and
   a rotating cylinder extending along the longitudinal axis within a portion of the cycloidal rotor and configured to generate a lateral anti-torque force, an axis of rotation of the rotating cylinder being eccentrically offset from the axis of rotation of the cycloidal rotor.

9. The helicopter of claim 8, wherein the plurality of blades have variable angles of attack for pitch and yaw stabilization.

10. The helicopter of claim 8, further comprising a tail propeller rotatably coupled at an aft position of the tail boom, the tail propeller having a tail propeller blades extending radially away from a tail propeller axis of rotation, the tail propeller axis of rotation being parallel to the longitudinal axis.

11. The helicopter of claim 10, wherein the tail propeller axis of rotation is coaxial with the cycloidal rotor axis of rotation.

12. The helicopter of claim 10, wherein the tail propeller is configured to rotate at a same rotational speed as the cycloidal rotor.

13. The helicopter of claim 10, wherein the tail propeller is coupled to the tail boom through a gear box.

14. The helicopter of claim 8, wherein the rotating cylinder includes a surface having a plurality of dimples.

15. The helicopter of claim 8, wherein the tail boom has a length that exceeds a span of one of the plurality of blades.

16. The helicopter of claim 8, wherein the inclinations of the plurality of blades relative to the respective trajectories of the plurality of blades is variable to generate a controllable thrust vector in any direction of a plane vertical to the longitudinal axis of the tail boom.

* * * * *